United States Patent [19]

Kamishima et al.

[11] Patent Number: 5,729,104
[45] Date of Patent: Mar. 17, 1998

[54] POWER WINDOW APPARATUS FOR VEHICLE

[75] Inventors: Hiroyuki Kamishima, Yokohama; Toshimasa Miwa, Zama, both of Japan

[73] Assignee: Nissan Motor Co., Ltd., Kanagawa-ken, Japan

[21] Appl. No.: 563,036

[22] Filed: Nov. 27, 1995

[30] Foreign Application Priority Data

Dec. 2, 1994 [JP] Japan ............... 6-299722
Dec. 26, 1994 [JP] Japan ............... 6-322703

[51] Int. Cl.⁶ .......................................... G05B 5/00
[52] U.S. Cl. .................. 318/446; 318/473; 318/474; 318/469; 318/282; 318/286; 49/28
[58] Field of Search .................. 318/471–473, 318/445–478, 280–300; 49/28

[56] References Cited

U.S. PATENT DOCUMENTS

| | | | |
|---|---|---|---|
| 4,641,067 | 2/1987 | Iizawa et al. | 318/287 |
| 4,686,598 | 8/1987 | Herr | 318/286 |
| 4,701,684 | 10/1987 | Seidel et al. | 318/456 |
| 5,229,695 | 7/1993 | Tsuda et al. | 318/434 |
| 5,351,439 | 10/1994 | Takeda et al. | 49/28 |
| 5,488,276 | 1/1996 | Nishibe | 318/473 |
| 5,559,375 | 9/1996 | Jo et al. | 318/471 |

FOREIGN PATENT DOCUMENTS

| | | |
|---|---|---|
| 60-185625 | 9/1985 | Japan . |
| 62-193082 | 12/1987 | Japan . |
| 5-12464 | 3/1993 | Japan . |

*Primary Examiner*—David S. Martin
*Attorney, Agent, or Firm*—Lowe, Price, LeBlanc & Becker

[57] ABSTRACT

Attention is given to that, when a catch-in state occurs while a vehicle window glass is moved upward, a current flowing in a motor serving as a drive means for moving the vehicle window glass increases. In an apparatus for comparing a predetermined current threshold value with a current detected by a motor current monitor unit to recognize a catch-in state, the predetermined current value is made variable, and the catch-in state can be correctly recognized without an erroneous operation even when the external environment changes, or when the window glass is moved upward for the first time. In particular, a current value obtained at the start of the motor and changed by a circumference temperature of the motor is set as a current threshold value, and the current threshold value is set each time the motor is started. A current value in an upward moving operation is estimated each time the window glass is moved downward to set the current value as a current threshold value.

18 Claims, 6 Drawing Sheets

POWER WINDOW APPARATUS FOR VEHICLE

BACKGROUND OF THE INVENTION

1. Field of The Invention

The present invention relates to a power window apparatus for vehicle for vertically moving a vehicle window glass and, more particularly, to a power window apparatus for a vehicle, having a function of detecting that an object is caught between a vehicle window frame and a vehicle window glass.

2. Prior Art

Various types of power window apparatuses using motors for opening/closing windows of vehicles such as automobiles are known and used practically. Since such a power window apparatus for vehicle can very easily open/close a vehicle window by a mere pushing operation of an opening/closing switch arranged on an inner side portion of the vehicle window, safety of a running vehicle can be improved.

As described above, a powered window can be opened/closed by simply pushing the opening/closing switch, and a conventional, relatively difficult, handle lever need not be rotated. For this reason, the window can be opened/closed by a child or by an aged person who is weak. However, since the window can be opened/closed by such a simple pushing of the opening/closing switch, if the opening/closing switch is pushed by accident so as to perform a closing operation, an object or the like may be caught in the window.

A power window apparatus for a vehicle which can cope with such a circumstance is disclosed as an "Automatic Vertical Moving Apparatus for Automobile Window Glass" in Japanese Examined Utility Model Publication No. 5-12464 and as a "Window Glass Vertical Moving Apparatus" in Japanese Unexamined Patent Publication No. 60-185625. These references provide an apparatus having a function of detecting that an object is caught between a window frame and a window glass in a vehicle and stopping the movement of the window glass.

In Japanese Examined Utility Model Publication No. 5-12464, a sliding resistance is measured at each position between the window frame and the window glass when the window glass is moved upward, and a determination value is set and held for detecting an obstructed state on the basis of the resistance. When the next sliding resistance does not exceed the determination value, the determination value is updated and held. When the next sliding resistance exceeds the determination value, it is determined that a state occurs wherein something is caught between a window frame and a window glass and obstructs movement of the window, and the window glass is moved downward or stopped. Such a state is hereinafter referred to as an obstructed state. When the sliding resistance exceeds the determination value, the determination value is not updated.

In addition, in Japanese Unexamined Patent Publication No. 60-185625, reference data obtained in a normal operation state of a motor is stored in advance, the reference data is compared with data obtained in an ON state of the motor at present to detect an abnormal ON state occurring when an abnormal load acts on a moving window glass, and emergency measures are performed such that the motor is rotated in the reverse direction.

More specifically, when an object is caught in a window to cause a load to act on a motor, a current flowing in the motor increases. For this reason, this increase in motor overload current is detected, and it is detected when the increased motor overload current exceeds a predetermined threshold value in order to recognize that an object or the like is caught in the window.

When a motor is driven, a relatively large inrush current first flows in the motor when the motor is started, and then a steady-state current flows after the inrush current. FIG. 1 is a graph showing the manner in which current flows in the motor as a function of time.

As is apparent from FIG. 1, when the motor is started at time t0, a relatively large inrush current of, e.g., about 12 A, flows in the motor. After this inrush current passes through the motor, the motor current decreases, and a relatively small steady-state current of, e.g., about 3 A, flows continuously from about time t1.

When the motor is driven by the steady-state current to close a vehicle window, and an object is caught in the window, an overload acts on the motor, thereby increasing the steady-state current of the motor. The motor overload current which increases in this case is relatively large, e.g., generally, 20 A.

Therefore, in the conventional apparatus in which an abnormal load is detected, in order to detect a motor overload current which is increased by catching an object in the window, a threshold value, e.g., 15 A, i.e., reference data is set. When the motor overload current exceeds the threshold value, it is determined that an object is caught in the window, thereby stopping the operation of the motor.

However, the above conventional apparatuses have the following problems.

According to Japanese Examined Utility Model Publication No. 5-12464, when a window glass is moved upward, a sliding resistance at each position between a window frame and the window glass is measured, and a determination value for detecting an obstructed state is set and held on the basis of the resistance. Therefore, when an external environment becomes different from that in which the held determination value is set, an erroneous operation may be performed. More specifically, for example, when the determination value is set in a warm location, and the vehicle is moved to a cold location, the sliding resistance between the window glass and the window frame increases due to freezing or the like. However, since the obstructed state is detected on the basis of the determination value set in the warm location, the obstructed state may be erroneously detected even if the obstructed state does not actually occur.

In addition, since the apparatus is designed to set the determination value only when the window glass is moved upward, an obstructed state cannot be detected when the window glass is moved upward for the first time.

In Japanese Unexamined Patent Publication No. 60-185625, as the external environment becomes different from that at the time of setting reference data changes, an erroneous operation may be performed in the same manner as described above.

More specifically, a relatively large inrush current flows when the motor is started. This inrush current is about 12 A in a normal state, is smaller than the above motor overload current, and can be satisfactorily discriminated from the motor overload current. However, the inrush current is changed by the environmental temperature of the motor. The inrush current is small when the environmental temperature of the motor is high, and increases when the environmental temperature falls.

FIG. 2 is a graph showing this concept, in which time and a current flowing in the motor are plotted on the abscissa and the ordinate, respectively. FIG. 2 also shows a change in inrush current at starting of the motor when the environmental temperature is used as a parameter. Referring to FIG. 2, a curve A indicates an inrush current when the environmental temperature of the motor is low, a curve C indicates an inrush current when the environmental temperature of the motor is high, and a curve B indicates an inrush current when the environmental temperature of the motor is medium.

As is apparent from FIG. 2, the inrush current of the motor is changed by the environmental temperature, and the inrush current increases when the environmental temperature falls. The increased inrush current may exceed the threshold value, i.e., the reference data.

Therefore, in the conventional apparatus, even if the inrush current exceeds the threshold value only because of a change in environmental temperature, the operation of the motor is disadvantageously stopped, since it is concluded that an object is caught in the window to cause an overload to act on the motor, thereby determining that the motor current exceeds the threshold value.

SUMMARY OF THE INVENTION

The present invention has been made in consideration of the above circumstances, and has as its object to correctly detect an obstructed state without an erroneous operation when an external environment changes or when a window glass is moved upward for the first time.

In order to achieve the above object, the present invention provides a power window apparatus for a vehicle comprising: a drive unit for vertically moving a vehicle window glass; a drive control unit for performing drive control of the drive unit; a load amount monitor unit for monitoring a load amount when the drive unit is driven; a temperature determination unit for determining an environmental temperature of the drive unit on the basis of an inrush current detected by the load monitor unit each time the drive unit is started; a threshold value setting unit for setting a threshold value for determining whether the load amount is an excessive load amount on the basis of the environmental temperature determined by the temperature determination unit; and an instruction output unit for outputting a stop or down instruction to the drive control unit when it is determined the load amount input from the load amount monitor unit exceeds the threshold value when the drive unit is driven.

In this manner, in the power window apparatus for vehicle according to the present invention, an inrush current at the start of a drive unit is detected, the environmental temperature of the drive unit is recognized on the basis of the detected inrush current, and a threshold value is changed on the basis of the environmental temperature of the drive unit. When a load acting on the drive unit exceeds the changed threshold value, the operation of the drive unit is stopped.

According to a preferred embodiment of the present invention, the power window apparatus for a vehicle further comprises a control unit for controlling the instruction output unit not to output the stop or down instruction when the environmental temperature detected by the temperature determination unit is not higher than a temperature at which a window is frozen or ice and snow adhere to the window even if it is determined that the load amount input from the load amount monitor unit exceeds the threshold value.

More specifically, when the environmental temperature of the motor is a temperature of, e.g., 0° C. or less, at which the window is frozen and ice and snow adhere to the window, control is performed in such a manner that the torque control of the motor is not performed.

According to another preferred embodiment of the present invention, the power window apparatus for vehicle further comprises a control unit for controlling the instruction output unit not to output the stop or down instruction when the environmental temperature detected by the temperature determination unit is not higher than a temperature at which a window is frozen or ice and snow adhere to the window and when a vehicle wiper is operated, even if it is determined that the load amount input from the load amount monitor unit exceeds the threshold value.

More specifically, when the environmental temperature of the motor is a temperature, e.g., 0° C. or less, and the vehicle wiper is operated, control is performed in such a manner that the torque control of the motor is not performed.

In order to achieve the above object, the present invention provides a power window apparatus for a vehicle comprising: drive unit for vertically moving a vehicle window glass; drive control unit for performing drive control of the drive unit; load amount monitor unit for monitoring a load amount when the drive unit is driven; vertical movement determination unit for determining whether the vehicle glass is in an upward movement state or a downward movement state; storage unit in which is stored a determination value serving as a reference for determining whether the vehicle window glass is normally moved upward; determination value setting unit for calculating an assumed load amount in the assumption that the upward movement state is set on the basis of the load amount detected by the load amount monitor unit each time the vertical movement determination unit determines that the downward movement state is set, and storing the assumed load amount in the storage unit as the determination value; and instruction output unit for, when the vertical movement determination unit determines that the upward movement state is set, comparing the determination value stored in the storage unit with the load amount detected by the load amount monitor unit to determine whether an obstructed state occurs in the vehicle window glass, and outputting a stop or down instruction to the drive control unit when it is determined that the obstructed state occurs.

More specifically, the drive control of the drive control unit causes the drive unit to vertically move the vehicle window glass. At the same time, the vertical moving determination unit determines whether the vehicle window glass is in the upward movement state or the downward movement state, and the load amount monitor unit detects a load amount of the drive unit in a driving state. Each time the vertical moving determination unit determines that the vehicle window glass is in the downward movement state, the determination value setting unit calculates an assumed load amount in the assumption that the upward movement state is set on the basis of the load amount detected by the load amount monitor unit, and the assumed load amount is stored in the storage unit as an updated determination value. Therefore, the determination value is updated and stored each time the vehicle window glass is moved downward. Consequently, even when the external environment changes, or when the vehicle window glass is moved upward for the first time, a determination value is properly updated and stored.

In addition, the instruction output unit compares the determination value stored in the storage unit with the load amount detected by the load amount monitor unit to determine whether an obstructed state occurs in the vehicle window glass. When it is determined that the obstructed state occurs, the instruction output unit outputs a stop or down instruction to the drive control unit. Therefore, when the obstructed state occurs, the obstructed state can be correctly detected without an erroneous operation, and a release from the obstructed state can be easily performed.

In still another preferred embodiment of the present invention, the drive unit is a motor, and the load amount is a current flowing in the drive unit.

Therefore, the load amount can be easily detected.

The nature, principle and utility of the invention will become still more apparent from the following detailed description when read in conjunction with the accompanying drawings.

DESCRIPTION OF THE PREFERRED EMBODIMENTS

Embodiments of the present invention will be described below with reference to the accompanying drawings.

Figure 3:
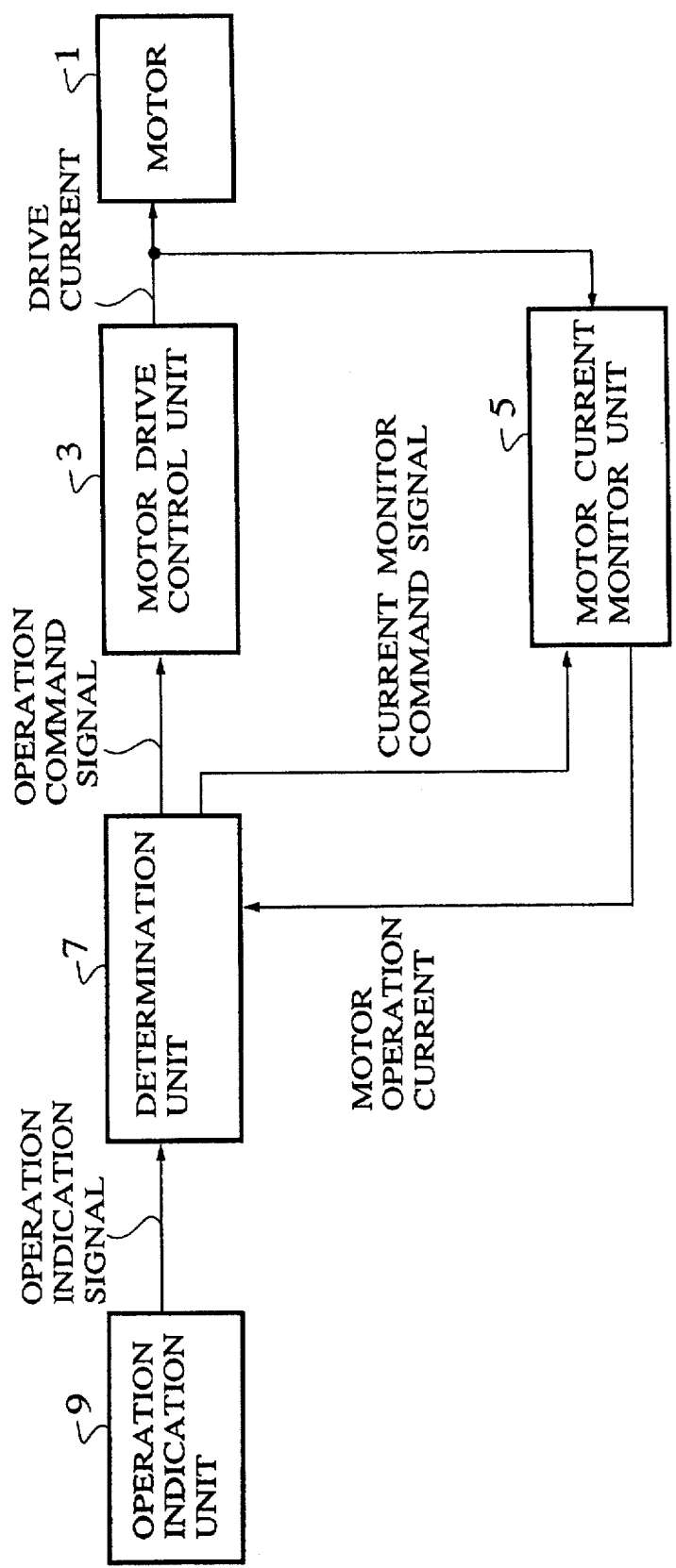
FIG. 3 is a block diagram showing the arrangement of a power window apparatus for a vehicle according to the first embodiment of the present invention.

FIG. 3 is a block diagram showing the arrangement of a power window apparatus for a vehicle according to the first embodiment of the present invention. The power window apparatus for vehicle shown in FIG. 3 has a motor 1 for opening/closing a vehicle window (not shown). The motor 1 is driven by a drive current supplied from a motor drive control unit 3, and a motor current monitor unit 5 monitors a current flowing in the motor 1. The motor drive control unit 3 and the motor current monitor unit 5 are connected to an operation indication unit 9 through a determination unit 7.

The operation indication unit 9 supplies an operation indication signal for starting the operation of the motor 1 to the determination unit 7. When the determination unit 7 receives the operation indication signal from the operation indication unit 9, the determination unit 7 supplies an operation command signal to the motor drive control unit 3 for operating the motor 1 and supplies a current monitor command signal to the motor current monitor unit 5 for monitoring a current flowing in the motor 1.

When the motor drive control unit 3 receives the operation command signal from the determination unit 7, the motor drive control unit 3 supplies current for driving the motor 1 to the motor 1, thereby starting the operation of the motor 1. When the operation of the motor 1 is started, the motor current monitor unit 5 detects the operation current of the motor 1 and supplies the detected motor operation current to the determination unit 7.

The determination unit 7 compares the motor operation current detected by the motor current monitor unit 5 with a predetermined threshold value. When the motor operation current exceeds the predetermined threshold value, the determination unit 7 determines that an object or the like is caught in a window to cause an overload to act on the motor 1, thereby causing the motor current to exceed the predetermined threshold value. The determination unit 7 has a function of causing the motor drive control unit 3 to stop the operation of the motor 1 on the basis of the above determination. It is noted that, however, that when the operation of the motor 1 is started, i.e., the motor 1 is started, the threshold value has not been set yet.

When the operation of the motor 1 is started, an inrush current flows in the motor 1 as described above. The motor current monitor unit 5 detects the inrush current of the motor 1 to detect an increase in inrush current when the inrush current rapidly increases, and supplies signals identifying the increase in inrush current to the determination unit 7. When determination unit 7 receives the signals identifying the rapid increase in inrush current from the motor current monitor unit 5, the determination unit 7 detects the peak value of the inrush current on the basis of the increase in inrush current. The determination unit 7 detects the environmental temperature of the motor 1 on the basis of the peak value of the detected inrush current. More specifically, when the peak value of the inrush current is larger, the determination unit 7 determines that the environmental temperature of the motor 1 is lower; and when the peak value is smaller, the determination unit 7 determines that the environmental temperature is higher.

When the determination unit 7 determines that the environmental temperature of the motor 1 is low, the threshold value is set to be relatively high. When the determination unit 7 determines that the environmental temperature of the motor 1 is high, the threshold value is set to be relatively low.

Figure 1:
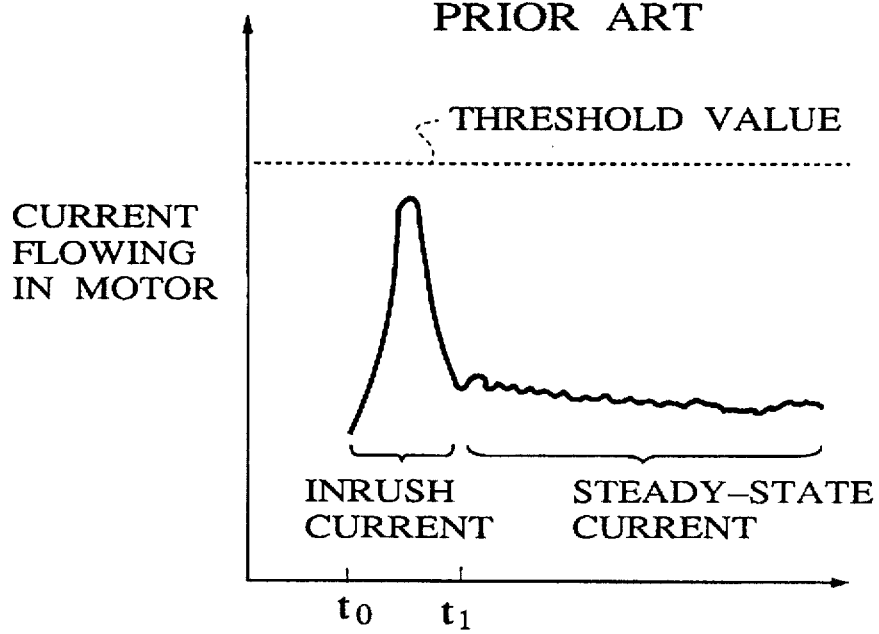
FIG. 1 is a graph showing a change in a current flowing in a motor with time.
Figure 2:
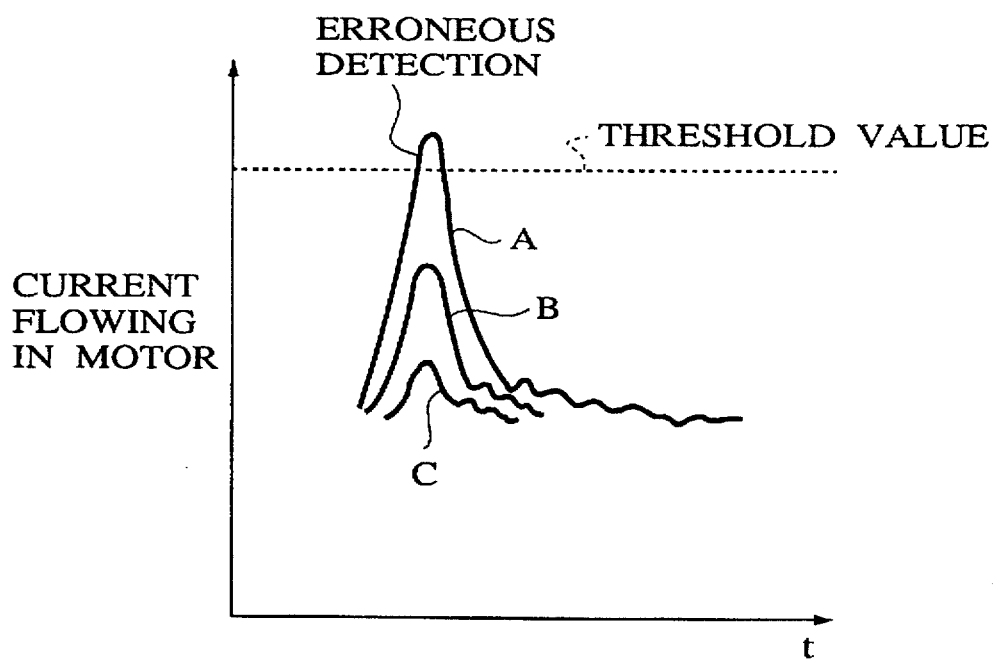
FIG. 2 is a graph showing an inrush current which varies according to the environmental temperature of the motor.

In this case, the inrush current serving as the determination reference is a current generated within a predetermined period of time $t_1$ after the motor is started as shown in FIG. 1. This period of time $t_1$ is dependent on an inductance component of the motor. On the basis of the period of time, it may be determined whether a generated current is an inrush current.

However, the inductance component of the motor is variably changed, and correct determination may not be easily performed due to a change in period of time $t_1$. For this reason, there is another method in which the differential value of a current is detected. Specifically, in accordance with this method a change point of the differential value detected for the first time is determined as a change caused by an inrush current, and the peak value of the current obtained at this time is set as the peak value of the inrush current. The inrush current is a current which flows for the first time after the motor is started, and a highly correct determination of the same can thus be performed.

As described above, in the determination unit 7, a threshold value for detecting a motor overload caused by catching an object or the like in the window is set to be changed according to the temperature of the environment of motor 1. For this reason, an inrush current which increases due to a low environmental temperature of the motor 1 is not erroneously detected as an increased motor current due to the overload, and, therefore, the motor 1 is not erroneously stopped.

Figure 4:
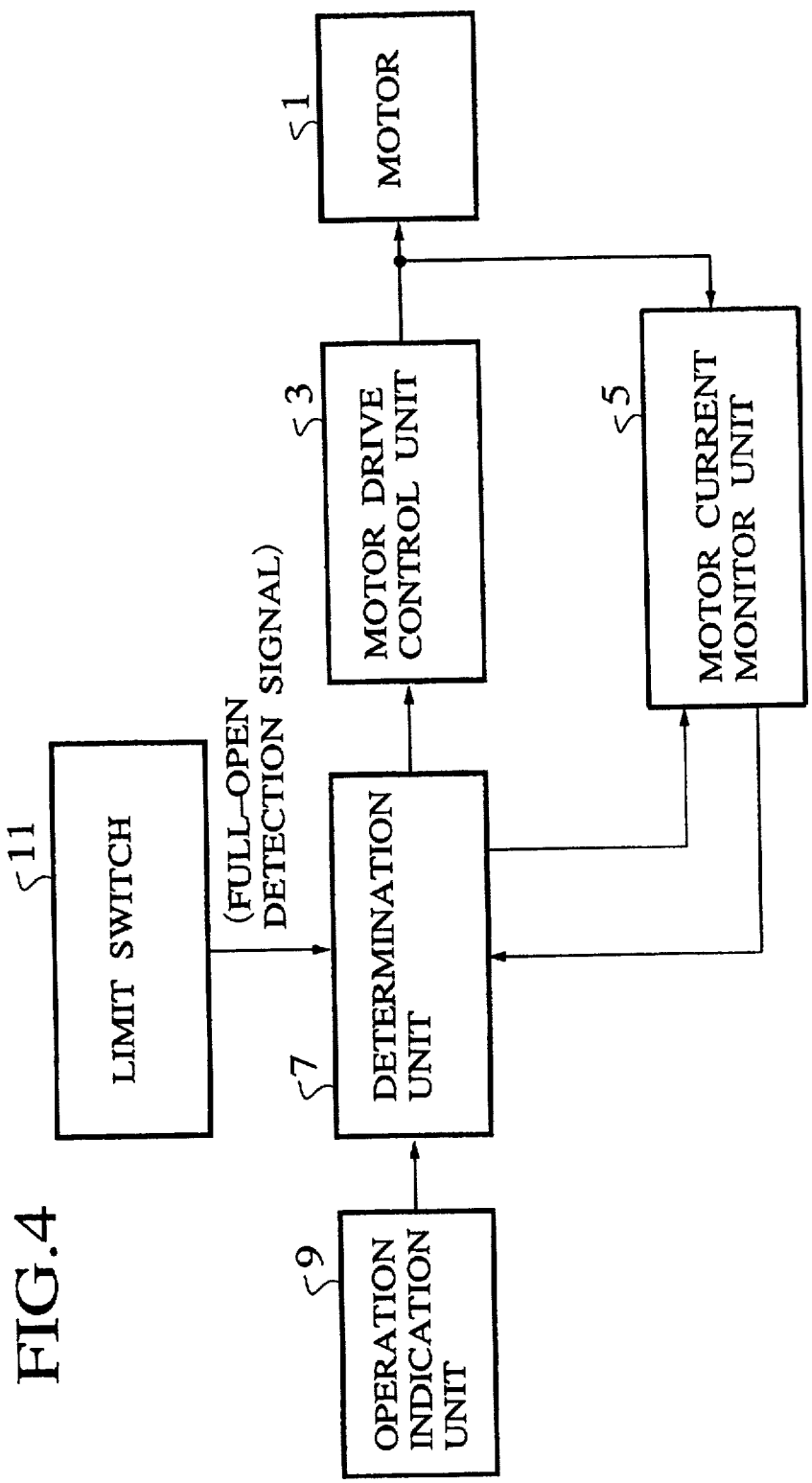
FIG. 4 is a block diagram showing the arrangement of a power window apparatus for a vehicle according to the second embodiment of the present invention.

FIG. 4 is a block diagram showing an arrangement of a power window apparatus for a vehicle according to the second embodiment of the present invention. The power window apparatus for a vehicle shown in FIG. 4 is different from the embodiment of FIG. 3 only in the following points. That is, a limit switch 11 for detecting a full-open state of a vehicle window is arranged, and torque control of a motor is not performed when determination unit 7 determines on the basis of the environmental temperature of the motor that the window may be frozen or that ice or snow may be adhering to the window. The remaining arrangement and effect of the second embodiment are the same as those of the embodiment in FIG. 3, and the same reference numerals as in FIG. 3 denote the same parts in FIG. 4.

The above-described torque control means a control for decreasing the output torque of the motor when it is detected that an object is caught in the window. For example, when the motor has a normal output torque of about 20 kg, and an obstructed state is detected, this output torque is controlled to be changed into about 10 kg. In addition, when the output torque is changed into 0 kg, the motor is stopped. A minus output torque of the motor means that the window is moved downward.

In the embodiment shown in FIG. 4, the window is closed by the operation of the motor 1, and when the window becomes set in a full-open state, a full-open detection signal is supplied from the limit switch 11 to the determination unit 7, and a lock current of the motor 1, which is generated when the window is in the full-open state, is detected by motor current monitor unit 5 which supplies the lock current to the determination unit 7. The determination unit 7 determines, on the basis of the lock current and the full-open detection signal from the limit switch 11, that the vehicle window is normally closed to cause a motor drive control unit 3 to stop the operation of the motor 1.

When the determination unit 7 does not receive the full-open detection signal from the limit switch 11 in spite of detecting the lock current through the motor current monitor unit 5, the determination unit 7 determines that an object or the like is caught in the vehicle window, and performs torque control of the motor 1 through the motor drive control unit 3.

In addition, as in the embodiment in FIG. 3, the determination unit 7 detects the peak value of an inrush current on the basis of an increase in inrush current of the motor 1 detected by the motor current monitor unit 5, detects the environmental temperature of the motor 1 on the basis of the peak value of the inrush current, and sets the threshold value according to the peak value of inrush current, and thus according to the corresponding environmental temperature of the motor 1. However, when it is determined from the inrush current that the detected environmental temperature of the motor is a sufficiently cold temperature, e.g., 0° C. or less, it is considered that the window frame is frozen by freezing or adhesion of ice and snow to the window in a cold location. For this reason, the determination unit 7 performs control in such a manner that the torque control of the motor 1 is not performed. When the inrush current is such as to indicate that the environmental temperature is not lower than 0° C., and a lock current flows, i.e., the operation current of the motor 1 exceeds the threshold value, the determination unit 7 determines that an object or the like is caught in the window to stop the operation of the motor 1 through the motor drive control unit 3.

Figure 5:
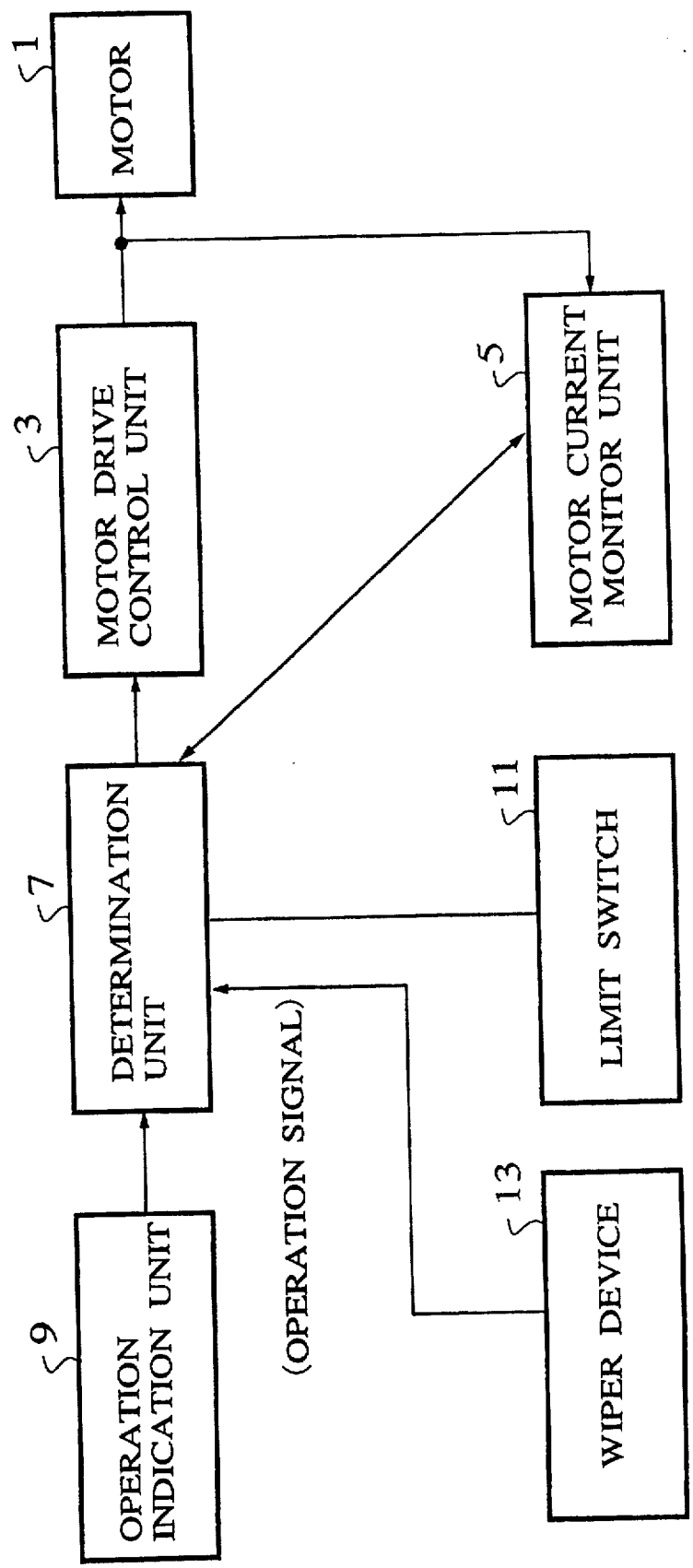
FIG. 5 is a block diagram showing the arrangement of a power window apparatus for a vehicle according to the third embodiment of the present invention.

FIG. 5 is a block diagram showing the arrangement of a power window apparatus for a vehicle according to the third embodiment of the present invention. The power window apparatus for a vehicle shown in FIG. 5 is different in the following point from the power window apparatus for a vehicle of the embodiment shown in FIG. 4. That is, a wiper device 13 is additionally connected to a determination unit 7 to monitor the operation of a wiper. The remaining arrangement and effect of the third embodiment are the same as those of the embodiment in FIG. 4, and the same reference numerals as in FIG. 4 denote the same parts in FIG. 5.

The determination unit 7 receives an operation signal from the wiper device 13 to determine whether the wiper is operated. When the wiper is operated, it is probably under conditions of rain or snow, and a window may be fairly prevented by these conditions from being vertically moved. For this reason, the torque control of the motor 1 is not performed while the wiper is operated. On the other hand, when the wiper is not operated, in the same manner as in each of the above embodiments, the threshold value is variably controlled on the basis of the environmental temperature of a motor 1 corresponding to the detected inrush current, and the variably controlled threshold value is compared with the operation current of the motor 1. When the motor operation current exceeds the threshold value, it is determined that an object or the like is caught in the window, and the operation of the motor is stopped.

As has been described above, according to the above embodiments, an inrush current generated at the start of the motor is detected, the environmental temperature of the motor is recognized on the basis of the detected inrush current, and a threshold value is changed on the basis of the environmental temperature of the motor, and more specifically on the basis of the detected inrush current. When a load acting on the motor exceeds the changed threshold value, the operation of the motor is stopped. Therefore, the inrush current (which increases due to a low environmental temperature of the motor) is not erroneously detected as a motor current which increases by an overload acting on the motor, and the motor is not erroneously stopped. Consequently, even if the environmental temperature of the motor changes, the opening/closing operation of the vehicle window can be properly performed.

An embodiment in which an obstructed state can be correctly detected without an erroneous operation even if a window glass is moved upward for the first time will be described below.

Figure 6:
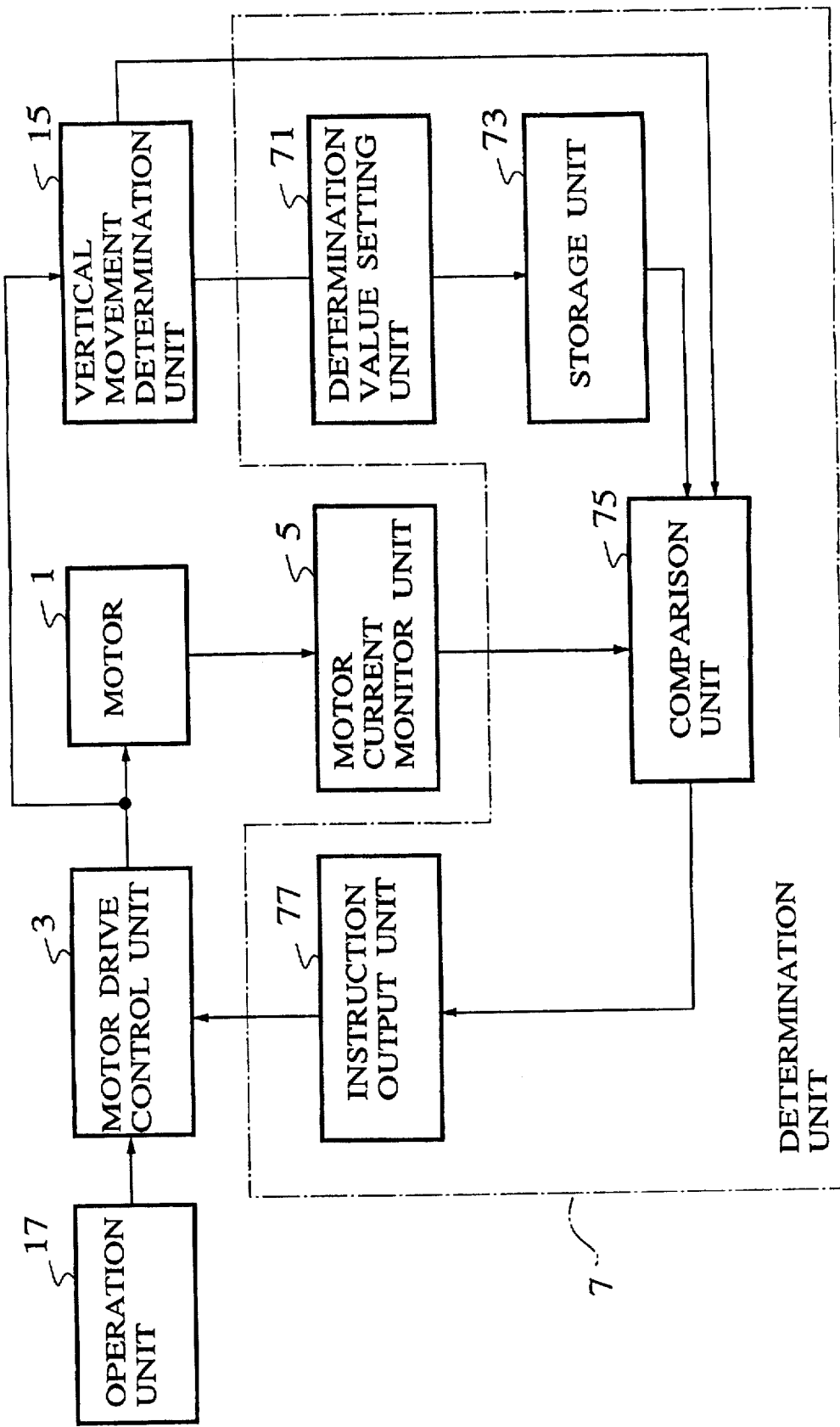
FIG. 6 is a block diagram showing the arrangement of a power window apparatus for a vehicle according to the fourth embodiment of the present invention.

FIG. 6 shows the arrangement of a power window apparatus for a vehicle according to the fourth embodiment of the invention. The power window apparatus for vehicle comprises a motor 1 serving as a drive means for vertically moving a window glass (not shown), an operation unit 17 serving as an input means for inputting a vertical movement instruction for the window glass, a motor drive control unit 3 serving as a drive control means which receives the vertical movement instruction from the operation unit 17 to control the forward/backward rotation, or to stop operation of, the motor 1, a vertical movement determination unit 15 serving as a vertical movement determination means which receives a drive signal from the motor drive control unit 3 to determine the vertical movement of the window glass, a motor current monitor unit 5 serving as a load amount detection means for detecting a current value (load amount) flowing in the motor 1 when the motor is rotated forward or backward, a determination value setting unit 71 serving as a determination value setting means for correcting the current value measured by the motor current monitor unit 5 on the basis of a signal from the vertical movement determination unit 15 to store the corrected current value as an obstructed state determination value in a storage unit 73 (to be described next), the storage unit 73 serving as a storage means for storing the obstructed state determination value set by the determination value setting unit 71, a comparison unit 75 for comparing the current value detected by the motor current monitor unit 5 with the obstructed state determination value stored in the storage unit 73, and an instruction output unit 77 for determining whether an obstructed state occurs in the window on the basis of a signal from the comparison unit 75 and for outputting a stop instruction or a down instruction to the motor drive control unit 3 when it is determined that the obstructed state occurs in the window.

Operation of the above arrangement will be described below. When a predetermined window-glass-up-switch of the operation unit 17 is operated, the motor drive control unit 3 receives a signal from the operation unit 17 to output a forward rotational drive signal to the motor 1. Responsively thereto, the motor 1 is rotated forward, and the window glass begins to move upward. When a predetermined window-glass-down-switch of the operation unit 17 is operated, the motor drive control unit 3 receives a signal from the operation unit 17 to output a backward rotational drive signal to the motor 1, the motor 1 is rotated backward, and the window glass begins to move downward.

On the other hand, the vertical movement determination unit 15 receives a drive signal from the motor drive control unit 3 to determine the vertical movement of the window glass, and outputs a determination result to the determination value setting unit 71. When the motor 1 is rotated forward or backward, the motor current monitor unit 5 detects the current value of the motor 1 every rotation, and outputs the detected current value to the determination value setting unit 71.

The determination value setting unit 71 sets an obstructed determination value for the motor current on the basis of the determination result of the vertical movement determination unit 15 and the current value detected by the motor current monitor unit 5. More specifically, when the window glass is in a downward movement state, the determination value setting unit 71 corrects the detected current in consideration of gravity to calculate an assumed load amount. The calculation is based on an assumption that the upward movement state is set, and the assumed load amount is stored in the storage unit 73 as an updated obstructed state determination value for motor current. On the other hand, when the window glass is in an upward movement state, the obstructed state determination value is not set.

Figure 7:
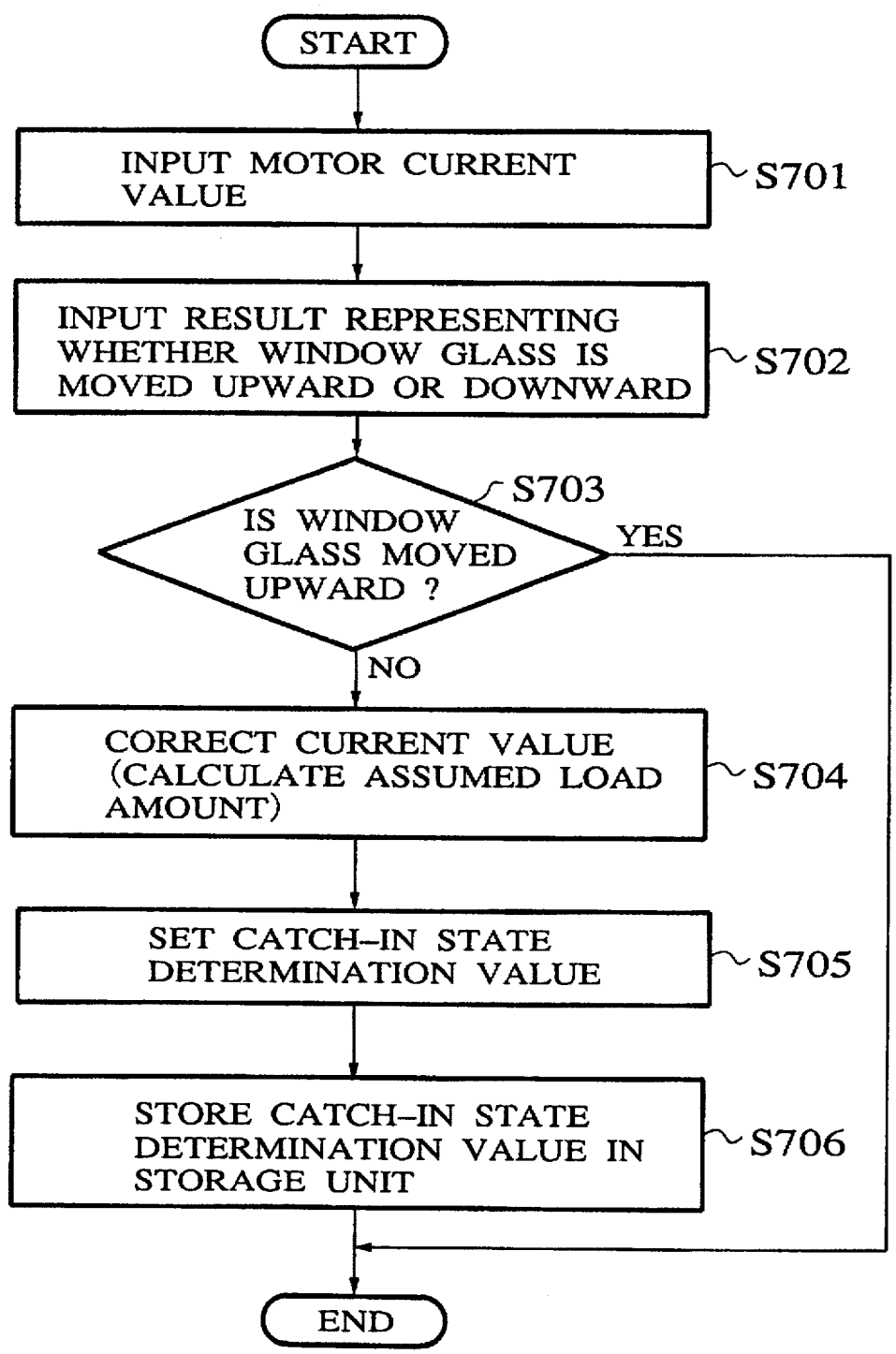
FIG. 7 is a flow chart showing operation of a determination value setting unit.

The operation of the determination value setting unit 71 will be described below with reference to the flow chart in FIG. 7. This operation is repeated each time the window glass is moved upward or downward. At step S701 the determination value setting unit 71 receives the current value detected by the motor current monitor unit 5. At step S702 the determination value setting unit 71 receives, from the vertical movement determination unit 15, the determination result representing whether the window glass is in an upward movement state or a downward movement state, thereby determining at step S703 whether the window glass is in the upward movement state or in the downward movement state.

When the window glass is determined to be in the downward movement state, the current value detected by the motor current monitor unit S is corrected in step S704 to calculate an assumed load amount, the assumed load amount is set as an updated obstructed state determination value in step S705, and the determination value is stored in the storage unit 73 in step S706.

In this manner, the determination value for determining whether the window glass moved upward normally is obtained on the basis of the determination state result of the vertical movement determination unit 15 and the current value detected by the motor current monitor unit 5. In other words, an obstructed state determination value for determining whether an obstructed state occurs, is stored in the storage unit 73 by the determination value setting unit 71.

On the other hand, the motor current monitor unit 5 outputs the detected current value to the comparison unit 75. Only when the window glass is moved upward, the comparison unit 75 compares the current value input from the motor current monitor unit 5 with the obstructed state determination value in the storage unit 73 on the basis of the determination result of the vertical movement determination unit 15, to output the comparison result to the instruction output unit 77.

The instruction output unit 77 receives the comparison result from the comparison unit 75. When the comparison step establishes that the current value is lessened or equal to the obstructed state determination value, the instruction output unit 77 determines that the window glass is normally moved upward/downward, to maintain operation of the motor drive control unit 3. In other words, a state is maintained in which the instruction output unit 77 waits for the comparison result from the comparison unit 75 without outputting a stop or down instruction.

When the comparison step establishes that the current value is greater than the obstructed state determination value, the instruction output unit 77 determines that an obstructed state occurs, and the instruction output unit 77 outputs a stop or a down instruction to the motor drive control unit 3.

As described above, according to this embodiment, when an obstructed state occurs while the window glass is being moved upward, and a passenger's, head, hand, or fingers are caught between the window glass and the window frame, the motor current monitor unit 5 detects a current value larger than that obtained in a normal operation state. At this time, the motor current monitor unit 5 outputs the current value to the comparison unit 75, the comparison unit 75 compares the current value with the obstructed state determination value stored in the storage unit 73, and the comparison result is output to the instruction output unit 77. When the instruction output unit 77 determines that the current value exceeds the obstructed state determination value, the instruction output unit 77 outputs a stop instruction or a backward rotation instruction for motor 1 to the motor drive control unit 3. Therefore, the window glass is stopped or moved downward, and a release from the obstructed state can be easily performed.

In addition, since the obstructed state determination value is always updated while the window glass is moved downward, an obstructed state can be correctly detected without erroneous operation even when the external environment changes, or when the window glass is moved upward for the first time.

It should be understood that many modifications and adaptations of the invention will become apparent to those skilled in the art and it is intended to encompass such obvious modifications and changes in the scope of the claims appended hereto.

What is claimed is:

1. A vehicle power window apparatus comprising:
a motor for vertically moving a vehicle window glass;
instruction output means for outputting a signal providing instructions for moving said vehicle window glass upward or downward or stopping said vehicle window glass;

drive control means responsive to the instructions from said instruction output means for executing control of said motor;

load amount detection means for detecting a load amount when said motor is operated;

threshold value setting means for setting a threshold value for comparison with the load amount detected by said load amount detection means;

current detection means for detecting a current flowing in said motor when said motor is operated, including:
  inrush current detection means for detecting an inrush current from the detected current;
  peak value detection means for detecting a peak value of the detected inrush current; and threshold change means for changing the threshold value on the basis of the peak value detected by said peak value detection means;

said instruction output means operating for providing in said signal one of:
  a first instruction to said drive control means for moving said window glass upwardly and
  a second instruction, provided to said drive control means in place of the first instruction when the load amount detected by said load amount detection means is larger than the threshold value, wherein said instruction output means selects for said second instruction one of an instruction for stopping said window glass and an instruction for moving said window glass downwardly;

said instruction output means replacing said second instruction by another instruction outputted to said drive control means, for neither stopping said window glass nor moving said window glass downwardly, when the peak value detected by said peak value detection means exceeds a predetermined value corresponding to an environmental temperature which is not higher than a freezing point temperature, and the load amount detected by said load amount detection means is larger than the threshold value.

2. A vehicle power window apparatus according to claim 1, wherein said threshold change means reduces the threshold value to a smaller value when the peak value is a first large value, and increases the threshold value to a large value when the peak value is a second value, smaller than said first large value.

3. A vehicle power window apparatus according to claim 1, wherein said load amount detection means is configured within the apparatus to operate as said current detection means.

4. A vehicle power window apparatus comprising:

a motor for vertically moving a vehicle window glass;

instruction output means for outputting a signal providing instructions for moving said vehicle window glass upward or downward or stopping said vehicle window glass;

drive control means responsive to the instructions from said instruction output means for executing control of said motor;

load amount detection means for detecting a load amount when said motor is operated;

threshold value setting means for setting a threshold value for comparison with the load amount detected by said load amount detection means;

current detection means for detecting a current flowing in said motor when said motor is operated, including:

inrush current detection means for detecting an inrush current from the detected current;

peak value detection means for detecting a peak value of the detected inrush current;

threshold change means for changing the threshold value on the basis of the peak value detected by said peak value detection means;

a wiper unit for operating a vehicle wiper; and wiper operation detection means for detecting whether said vehicle wiper is operated;

said instruction output means operating for providing in said signal one of:
  a first instruction to said drive control means for moving said window glass upwardly and
  a second instruction, provided to said drive control means in place of the first instruction when the load amount detected by said load amount detection means is larger than the threshold value, wherein said instruction output means selects for said second instruction one of an instruction for stopping said window glass and an instruction for moving said window glass downwardly;

said instruction output means replacing said second instruction by another instruction outputted to said drive control means, for neither stopping said window glass nor moving said window glass downwardly, when said vehicle wiper is operated, the peak value detected by said peak value detection means exceeds a predetermined value corresponding to an environmental temperature which is not higher than a freezing point temperature, and the load amount detected by said load amount detection means is larger than the threshold value.

5. A vehicle power window apparatus according to claim 4, wherein said threshold change means reduces the threshold value to a smaller value when the peak value is a first large value, and increases the threshold value to a large value when the peak value is a second value, smaller than said first large value.

6. A vehicle power window apparatus according to claim 4, wherein said load amount detection means is configured within the apparatus to operate as said current detection means.

7. A vehicle power window apparatus comprising:

a motor for vertically moving a vehicle window glass;

instruction output means for outputting a signal providing instructions for moving said vehicle window glass upward or downward or stopping said vehicle window glass;

drive control means responsive to the instructions from said instruction output means for executing control of said motor;

load amount detection means for detecting a load amount when said motor is operated;

threshold value setting means for setting a threshold value for comparison with the load amount detected by said load amount detection means;

said instruction output means operating for providing in said signal one of:
  a first instruction to said drive control means for moving said window glass upwardly and
  a second instruction, provided to said drive control means in place of the first instruction when the load amount detected by said load amount detection means is larger than the threshold value, wherein said second instruction is an instruction for reducing force applied for moving said window glass upward;

current detection means for detecting a current flowing in said motor when said motor is operated, including:
inrush current detection means for detecting an inrush current from the detected current;
peak value detection means for detecting a peak value of the detected inrush current; and
threshold change means for changing the threshold value on the basis of the peak value detected by said peak value detection means.

8. A vehicle power window apparatus according to claim 7, wherein said threshold change means reduces the threshold value to a smaller value when the peak value is a first large value, and increases the threshold value to a large value when the peak value is a second value, smaller than said first large value.

9. A vehicle power window apparatus according to claim 7, wherein said load amount detection means is configured within the apparatus to operate as said current detection means.

10. A vehicle power window apparatus comprising:
a motor for vertically moving a vehicle window glass;
instruction output means for outputting a signal providing instructions for moving said vehicle window glass upward or downward or stopping said vehicle window glass;
drive control means responsive to the instructions from said instruction output means for executing control of said motor;
load amount detection means for detecting a load amount when said motor is operated;
threshold value setting means for setting a threshold value for comparison with the load amount detected by said load amount detection means;
current detection means for detecting a current flowing in said motor when said motor is operated, including:
inrush current detection means for detecting an inrush current from the detected current;
peak value detection means for detecting a peak value of the detected inrush current; and
threshold change means for changing the threshold value on the basis of the peak value detection by said peak value detection means;
said instruction output means operating for providing in said signal one of:
a first instruction to said drive control means for moving said window glass upwardly and
a second instruction, provided to said drive control means in place of the first instruction when the load amount detected by said load amount detection means is larger than the threshold value, wherein said second instruction is an instruction for reducing force applied for moving said window glass upward;
said instruction output means replacing said second instruction by another instruction outputted to said drive control means, for not reducing force applied for moving said window glass upward, when the peak value detected by said peak value detection means exceeds a predetermined value corresponding to an environmental temperature which is not higher than a freezing point temperature, and the load amount detected by said load amount detection means is larger than the threshold value.

11. A vehicle power window apparatus according to claim 10, wherein said threshold change means reduces the threshold value to a smaller value when the peak value is a first large value, and increases the threshold value to a large value when the peak value is a second value, smaller than said first large value.

12. A vehicle power window apparatus according to claim 10, wherein said load amount detection means is configured within the apparatus to operate as said current detection means.

13. A vehicle power window apparatus comprising:
a motor for vertically moving a vehicle window glass;
instruction output means for outputting a signal providing instructions for moving said vehicle window glass upward or downward or stopping said vehicle window glass;
drive control means responsive to the instructions from said instruction output means for executing control of said motor;
load amount detection means for detecting a load amount when said motor is operated;
threshold value setting means for setting a threshold value for comparison with the load amount detected by said load amount detection means;
current detection means for detecting a current flowing in said motor when said motor is operated, including:
inrush current detection means for detecting an inrush current from the detected current;
peak value detection means for detecting a peak value of the detected inrush current;
threshold change means for changing the threshold value on the basis of the peak value detected by said peak value detection means;
a wiper unit for operating a vehicle wiper; and
wiper operation detection means for detecting whether said vehicle wiper is operated;
said instruction output means operating for providing in said signal one of:
a first instruction to said drive control means for moving said window glass upwardly and
a second instruction, provided to said drive control means in place of the first instruction when the load amount detected by said load amount detection means is larger than the threshold value,
said instruction output means selecting for said second instruction one of an instruction for stopping said window glass and an instruction for moving said window glass downwardly;
said instruction output means replacing said second instruction by another instruction outputted to said drive control means, for not reducing force applied for moving said window glass upward, when said vehicle wiper is operated, the peak value detected by said peak value detection means exceeds a predetermined value corresponding to an environmental temperature which is not higher than a freezing point temperature, and the load amount detected by said load amount detection means is larger than the threshold value.

14. A vehicle power window apparatus according to claim 13, wherein said threshold change means reduces the threshold value to a smaller value when the peak value is a first larger value, and increases the threshold value to a large value when the peak value is a second value, smaller than said first large value.

15. A vehicle power window apparatus according to claim 13, wherein said load amount detection means is configured within the apparatus to operate as said current detection means.

16. A vehicle power window apparatus comprising:

a motor for vertically moving a vehicle window glass;

instruction output means for outputting a signal providing instructions for moving said vehicle window glass upward or downward or stopping said vehicle window glass;

drive control means responsive to the instructions from said instruction output means for executing control of said motor;

load amount detection means for detecting a load amount when said motor is operated;

threshold value setting means for setting a threshold value for comparison with the load amount detected by said load amount detection means;

said instruction output means operating for providing in said signal one of:
- a first instruction to said drive control means for moving said window glass upwardly and
- a second instruction, provided to said drive control means in place of the first instruction when the load amount detected by said load amount detection means is larger than the threshold value, wherein said instruction output means selects for said second instruction one of an instruction for stopping said window glass and an instruction for moving said window glass downwardly;

current detection means for detecting a current flowing in said motor when said motor is operated, including:
- inrush current detection means for detecting an inrush current from the detected current;
- peak value detection means for detecting a peak value of the detected inrush current; and
- threshold change means for changing the threshold value on the basis of the peak value detected by said peak value detection means.

17. A vehicle power window apparatus according to claim 16, wherein said threshold change means reduces the threshold value to a smaller value when the peak value is a first large value, and increases the threshold value to a large value when the peak value is a second value, smaller than said first large value.

18. A vehicle power window apparatus according to claim 16, wherein said load amount detection means is configured within the apparatus to operate as said current detection means.

* * * * *